B. A. Ramsey,
Cotton Planter.
No. 110,393. Patented Dec. 20, 1870.
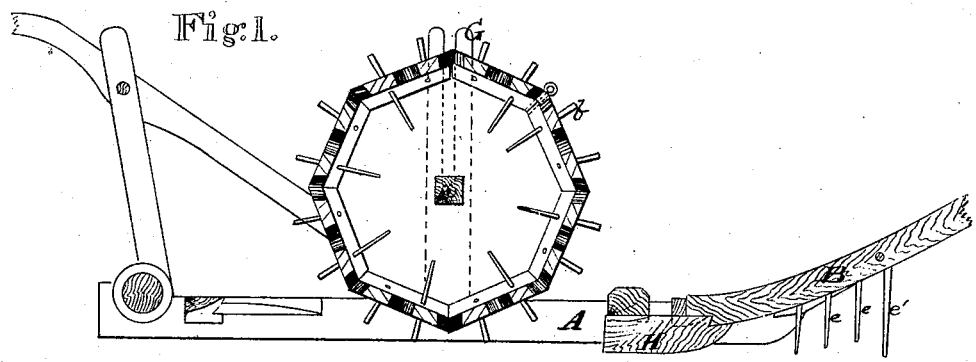
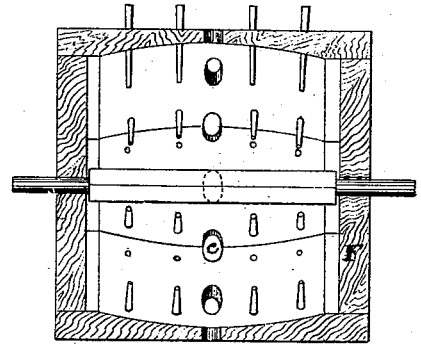
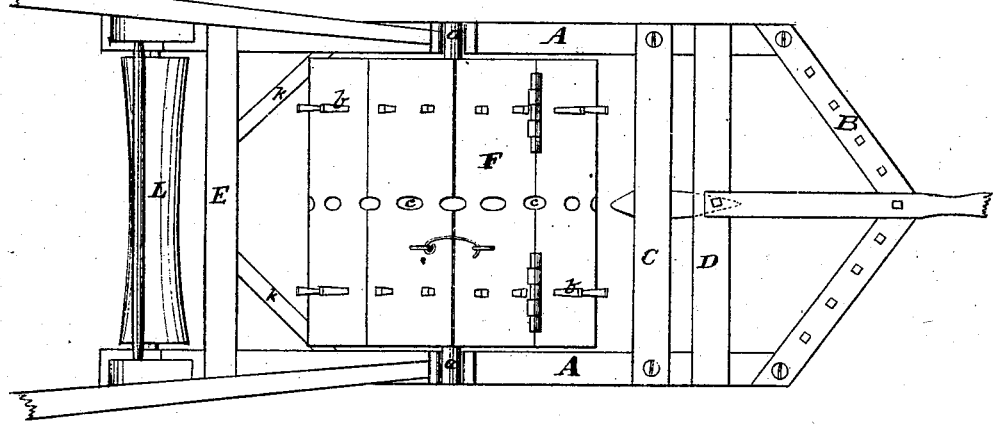
Witnesses.
Villette Anderson
Chat. Kenyon
Inventor.
B. A. Ramsey,
Chipman Hosmer & Co,
Attorneys.

United States Patent Office.

BLACKMAN ASBURY RAMSEY, OF TRENTON, TENNESSEE.

Letters Patent No. 110,393, dated December 20, 1870; antedated December 13, 1870.

IMPROVEMENT IN COTTON-PLANTERS.

The Schedule referred to in these Letters Patent and making part of the same.

*To all whom it may concern:*

Be it known that I, BLACKMAN ASBURY RAMSEY, of Trenton, in the county of Gibson and State of Tennessee, have invented a new and valuable Improvement in Cotton-Planters; and I do hereby declare that the following is a full, clear, and exact description of the construction and operation of the same, reference being had to the annexed drawing making a part of this specification, and to the letters and figures of reference marked thereon.

Figure 1 of the drawing is a central vertical longitudinal section of my cotton-planter.

Figure 2 is a transverse section of the seed-barrel.

Figure 3 is a top view of the planter.

My invention relates to machines for planting cotton, and consists in certain improvements in the seed-drum, harrow, and covering devices, whereby the seed are caused to pass in sufficient quantity through the perforations of the drum while, at the same time, the soil is prepared, the furrow opened, the seed covered, and the ridge smoothed in a satisfactory manner.

The letters A of the drawing designate the longitudinal strips which form the sides or runners of the frame.

These strips are connected in front by the harrow-frame B and cross-ties C D, and in rear by the tie E.

F represents the seed-drum, provided with journals, *a a*, arranged to rotate in the vertical slots of the uprights G.

The exit openings *c* for the seed are elliptical in form, with the long axis extending in the direction of the furrow.

*b b* represent pins driven through the prismatic or cylindrical wall of the drum in such a manner that they project partly without and partly within the drum.

The inner surface of the drum is made to slope or incline from the heads thereof toward the center or line of openings *c c*, thus causing a tendency of the seed toward these openings.

B represents the harrow-frame, arranged to slope forward and upward, to correspond with the form of the ridge.

The central tooth, *e'*, of the harrow is of metal and somewhat longer than its fellows, *e e*, on each side. The latter are usually of wood.

The cross-tie D is concave on its under side, to correspond with the form of the ridge, and serves to smooth the surface thereof after being scratched by the harrow.

H is the furrowing-shoe, fastened to the ties C D.

E is the rear connecting-tie, also made concave on its lower side, and provided with the inner corner braces *k k*, both braces and tie being beveled on the forward and under side in such a manner as to draw the soil over the seed in the furrow.

In rear of this tie is pivoted the concave roller L.

The operation of my invention is as follows:

The passing of the harrow over the ridge scratches the surface and forms it roughly, throwing off the loose clods therefrom, while the long central tooth breaks the ground for the shoe. The concave tie in front of the drum forms the ridge and pulverizes the clods; the furrow being made by the shoe, the seed are dropped into it by the drum through the exit openings.

Cotton seed are somewhat oleaginous and are covered with lint, and hence they have a tendency to agglomerate. This is prevented by the projecting pins inside the drum, which not only break up the masses but serve to carry the seed upward as the drum rotates, thus causing it to fall from a height upon the bottom of the drum and through the openings.

The elliptical shape of these openings is designed to permit a plentiful supply of seed to be sown while none will be scattered outside of the furrow.

The openings are prevented from becoming clogged with the earth by the fact that the drum is kept from contact with the ground by the exterior pins. These, at the same time, promote the rotation of the drum.

As the journals are arranged to have free vertical motion in the slots of the uprights, the drum is enabled to accommodate itself to the uneven places on the ridge.

The seed being dropped in the furrow are covered by the beveled tie and braces following, and the ridge is finally rolled and shaped by the concave roller.

What I claim as my invention, and desire to secure by Letters Patent, is—

1. The cotton-planter herein described, having automatically-adjustable barrel F, concave crushing and smoothing ties D E, concave harrow B, and concave roller L, when constructed and arranged as and for the purposes specified.

2. In a cotton-planter, the concave harrow B, adapted to the form of the ridge, having its central tooth *e'* longer than its fellows, to open the way for the furrowing-shoe, as specified.

3. In combination with the slotted uprights G of the frame, the automatically-adjustable seed-barrel F, having inner wall sloping to the center, and elliptical exit opening *c*, and provided with the pins *b* extending partly within and partly without the barrel, as specified.

In testimony that I claim the above I have hereunto subscribed my name in the presence of two witnesses.

B. A. RAMSEY.

Witnesess:
L. M. JONES,
J. T. COUTRE.